United States Patent [19]
Hirata

[11] Patent Number: 5,414,763
[45] Date of Patent: May 9, 1995

[54] APPARATUS AND METHOD FOR PROVIDING ECHO SUPPRESSION TO A PLURALITY OF TELEPHONES

[75] Inventor: Osamu Hirata, Tokyo, Japan

[73] Assignee: Canon Kabushiki Kaisha, Tokyo, Japan

[21] Appl. No.: 840,531

[22] Filed: Feb. 25, 1992

[30] Foreign Application Priority Data

Apr. 9, 1991 [JP] Japan .................. 3-103829

[51] Int. Cl.⁶ ............................. H04M 3/42
[52] U.S. Cl. .................... 379/201; 379/250; 379/388; 379/406; 379/240
[58] Field of Search ............ 379/250, 388, 389, 406, 379/407, 409, 410, 240

[56] References Cited

U.S. PATENT DOCUMENTS

| | | | |
|---|---|---|---|
| 3,673,335 | 6/1972 | Joel | 379/250 |
| 4,005,277 | 1/1977 | Araseki | 379/406 |
| 4,008,376 | 2/1977 | Flanagan | 379/250 |
| 4,979,163 | 12/1990 | Erving | 379/388 |
| 4,991,166 | 2/1991 | Julstrom | 379/388 |
| 5,001,744 | 3/1991 | Nishino et al. | |
| 5,034,978 | 7/1991 | Nguyen | 379/250 |
| 5,263,083 | 11/1993 | Rust | 379/242 |

FOREIGN PATENT DOCUMENTS

| | | | |
|---|---|---|---|
| 0004504 | 1/1979 | Japan | 379/250 |
| 0004510 | 1/1979 | Japan | 379/250 |
| 0093795 | 5/1986 | Japan | 379/250 |
| 0005250 | 1/1989 | Japan | 379/388 |
| 253353 | 10/1989 | Japan | 379/389 |
| 0288145 | 11/1989 | Japan | 379/388 |
| 404154395 | 5/1992 | Japan | 379/250 |

*Primary Examiner*—James L. Dwyer
*Assistant Examiner*—Michael N. Lau
*Attorney, Agent, or Firm*—Fitzpatrick, Cella, Harper & Scinto

[57] ABSTRACT

A telephone switching apparatus includes a line network to which first and second telephones are connected and a hands-free trunk whose input and output terminals are connected to the line network. The line network is controlled such that voices from the first and second telephones are transmitted to the second and first telephones, respectively, through the hands-free trunk. A call transfer apparatus includes an outside-line interface to which first and second outside lines are connected and an adjusting unit for comparing the volumes of voices from the first and second outside lines and adjusting the volumes of the voices in accordance with the results of the comparison. The voices input from the first and second outside lines and adjusted in volume are transmitted to the second and first outside lines, respectively.

13 Claims, 7 Drawing Sheets

APPARATUS AND METHOD FOR PROVIDING ECHO SUPPRESSION TO A PLURALITY OF TELEPHONES

BACKGROUND OF THE INVENTION

1. Field of the Invention

The present invention relates to a telephone switching apparatus having a plurality of outside lines and extensions.

2. Description of the Related Art

Figure 6:
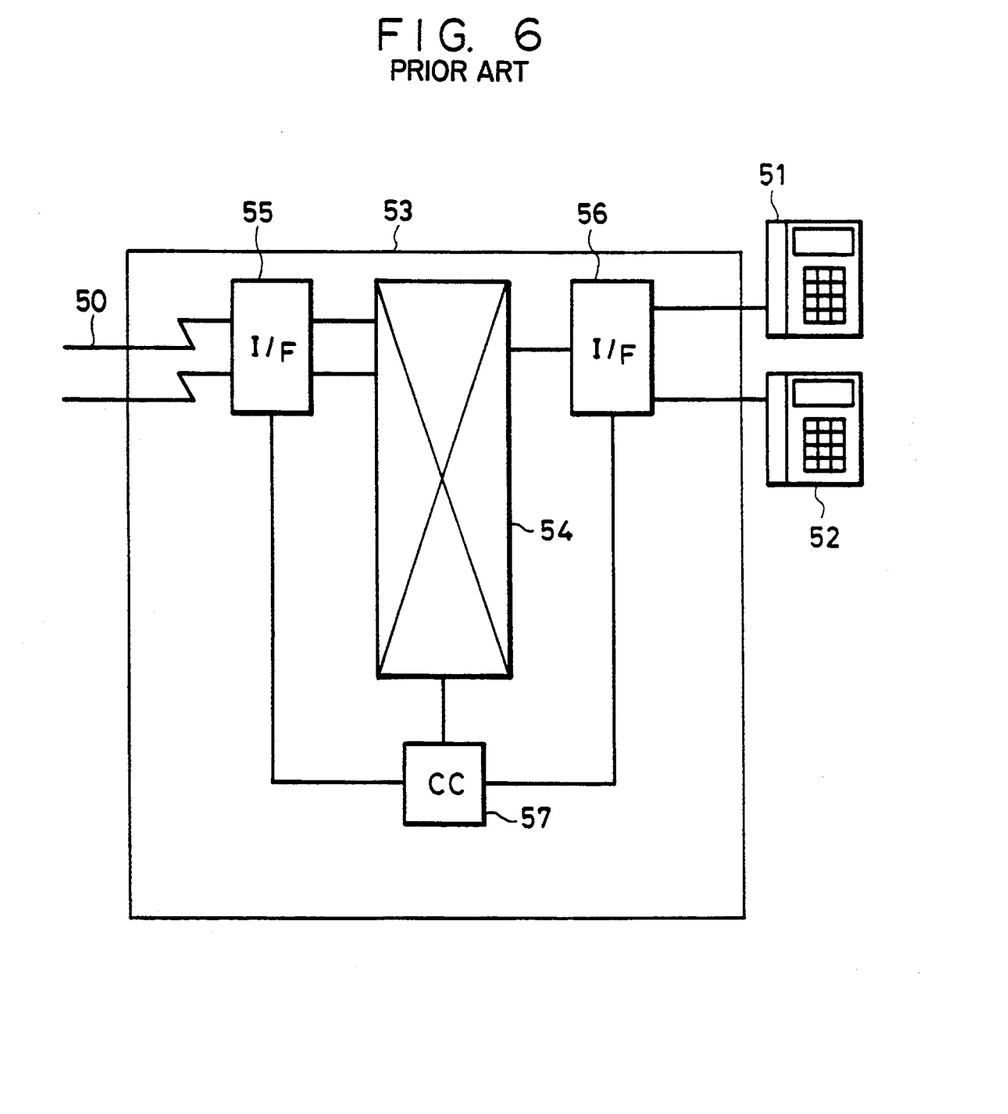
FIG. 6 is a diagram illustrating the overall construction of a conventional telephone switching apparatus.

FIG. 6 illustrates a telephone switching apparatus having a telephone line 50 and extension telephones 51 and 52. As is generally the case with a telephone switching apparatus, the telephone line 50 and extension telephones 51 and 52 of this system are connected through a private branch exchange 53, which performs channel setting. The private branch exchange 53 includes a time-division switch 54, an outside-line interface section 55, an extension interface section 56, and a switching control section 57. A predetermined channel setting is performed by the time-division switch 54, which is controlled by the switching control section 57.

In a telephone switching apparatus of the above-described type, telephonic communication with the terminal on the other end of the line may be conducted through a microphone and speaker. In that case, an extension telephone having a built-in hands-free circuit is employed for the purpose of preventing howling. The hands-free circuit is a circuit which compares the level of a transmission signal from the extension telephone with the level of a reception signal from the outside line, muting the signal at the lower level. The circuit is also referred to as an echo suppressor circuit.

Figure 7:
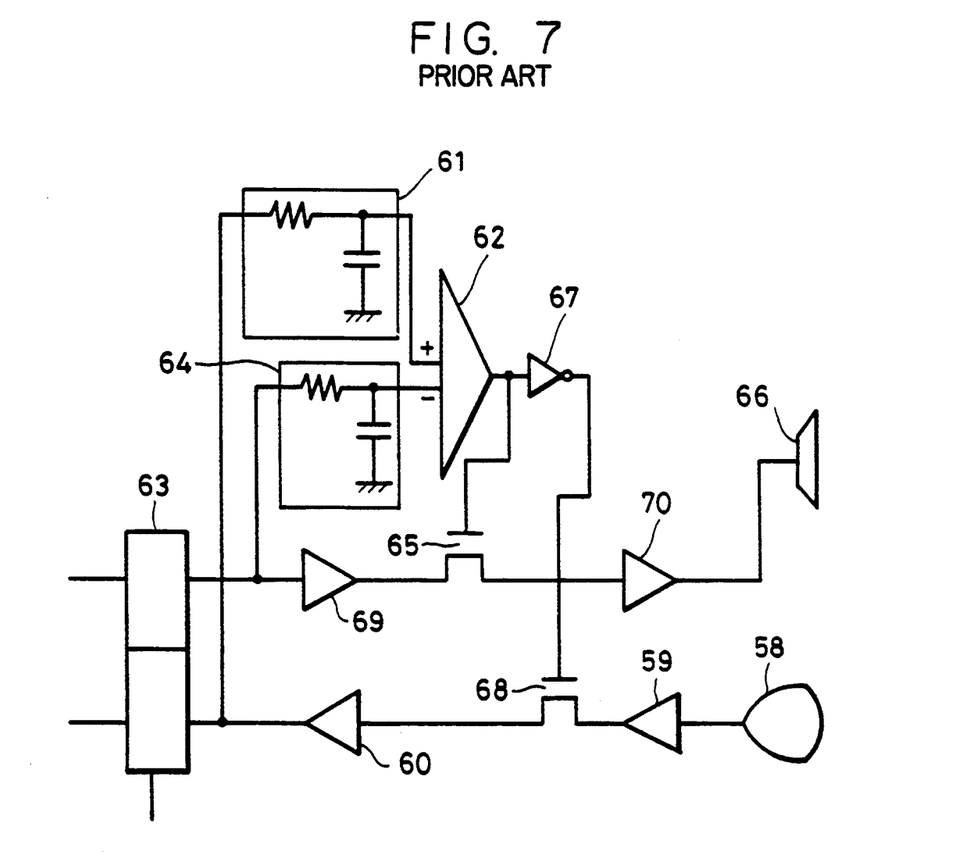
FIG. 7 is a circuit diagram showing a conventionally used hands-free circuit.

FIG. 7 is a circuit diagram illustrating such a hands-free circuit. A transmission voice signal from a microphone 58 of the extension telephone 51 or 52 is amplified by amplifiers 59 and 60 and supplied to a comparator 62 through a low-pass circuit 61. A reception voice signal from the side of the private branch exchange 53 is converted to an analog signal by a D/A converter 63 and supplied to the comparator 62 through a low-pass circuit 64. The levels of the transmission and reception signals are compared with each other by the comparator 62. When the level of the transmission signal is higher than that of the reception signal, the output of the comparator 62 is "High", and a switch 65 is turned OFF, thereby preventing the reception voice from being output from a speaker 66. The output of the comparator 62 is inverted by an inverter 67, and a switch 68 is maintained in the ON position. Thus, either the switch 65 or 68 is turned OFF in accordance with the output of the comparator 62, thereby realizing a hands-free function. Reference numerals 69 and 70 indicate amplifiers. When the switch 65 is in the ON position and the switch 68 is in the OFF position, these amplifiers amplify the transmission voice signal to output a voice from the speaker 66.

By virtue of this hands-free function, a permanent one-way telephonic conversation is realized, in which the speaker sound is prevented from being picked up by the microphone and amplified. Further, in the case where the terminal on the other end of the line is an analog terminal or where an analog main wire (or analog station line) is used, it is possible to prevent the generation of howling caused by the returning transmission signal.

However, to ensure a hands-free function for such a telephone exchange system, it is necessary to use extension telephones having built-in hands-free circuits (echo suppressor circuits). If the hands-free function is to be ensured all over on the extension side, all the extension telephones must be hands-free types, resulting in a rather expensive system.

Further, in conventional private branch exchanges, an outside-line transfer may involve a reflection of a transmission signal as a result of a mismatching of the balancing circuit due to the two-wire/four-wire switching. Thus, adjustment of the voice-volume level will cause the generation of a howling noise.

SUMMARY OF THE INVENTION

It is an object of the present invention to provide an improved telephone switching apparatus.

Another object of the present invention is to provide a less expensive telephone switching apparatus without involving any deterioration in performance.

Still another object of the present invention is to provide an inexpensive telephone switching apparatus having a hands-free function.

A further object of the present invention is to provide a telephone switching apparatus having a howling prevention function.

A still further object of the present invention is to realize an improved outside-line transfer.

A still further object of the present invention is to prevent the generation of a howling noise at the time of outside-line transfer.

Other objects of the present invention will become apparent from the following description of the preferred embodiments.

DETAILED DESCRIPTION OF THE PREFERRED EMBODIMENTS

Figure 1:
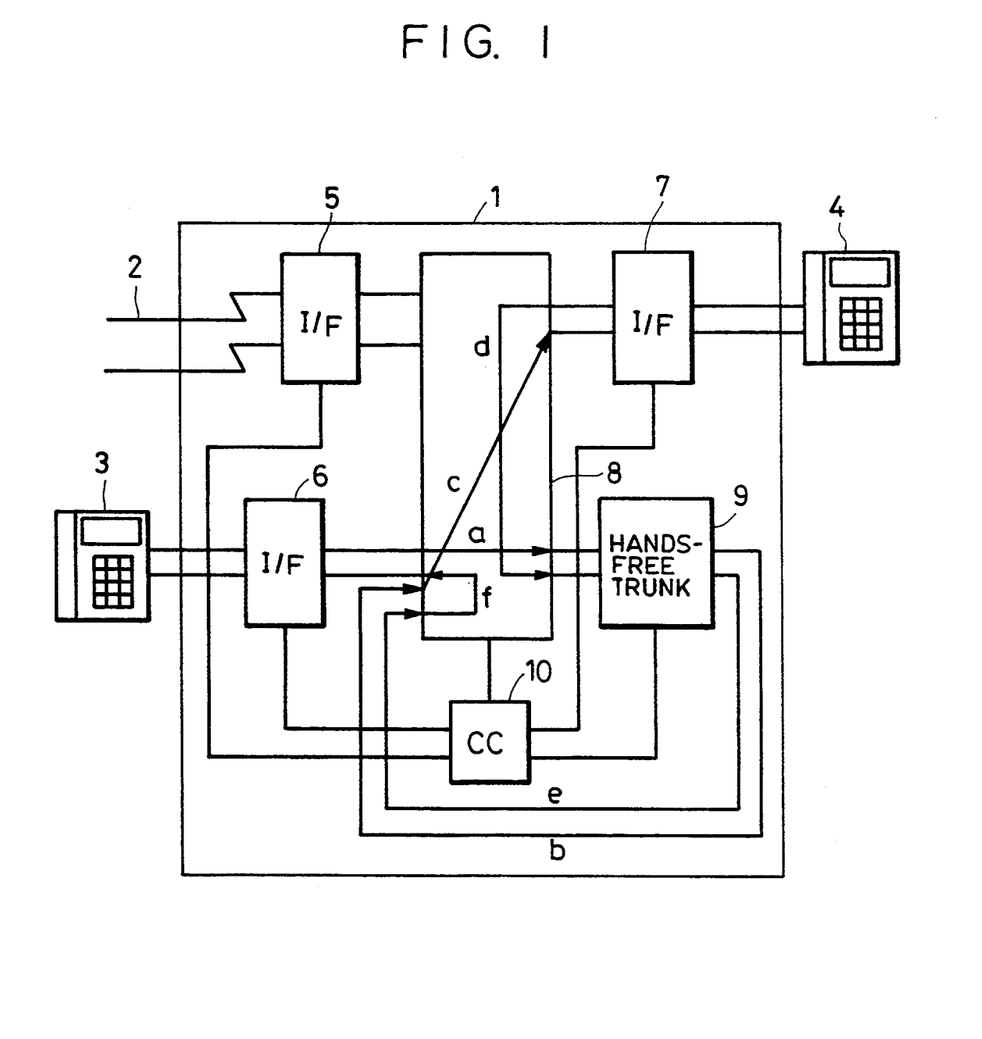
FIG. 1 is a diagram illustrating the signal flow during an extension hands-free conversation in an embodiment of the switching apparatus of the present invention.

FIG. 1 is a conceptual drawing schematically showing a private branch exchange 1 in accordance with the present invention. The private branch exchange 1 is arranged between a telephone line 2 of the two-wire-switching type and two extension telephones 3 and 4.

The private branch exchange 1 comprises an outside-line interface section 5 for connecting outside lines, extension interface sections 6 and 7 for connecting extensions, a time-division switch 8 for performing channel switching or the like, a hands-free trunk 9 having a built-in hands-free circuit for selecting and outputting the one of two time-slot signals which has a higher level, and a switching control section 10 for controlling the above components.

Figure 2:
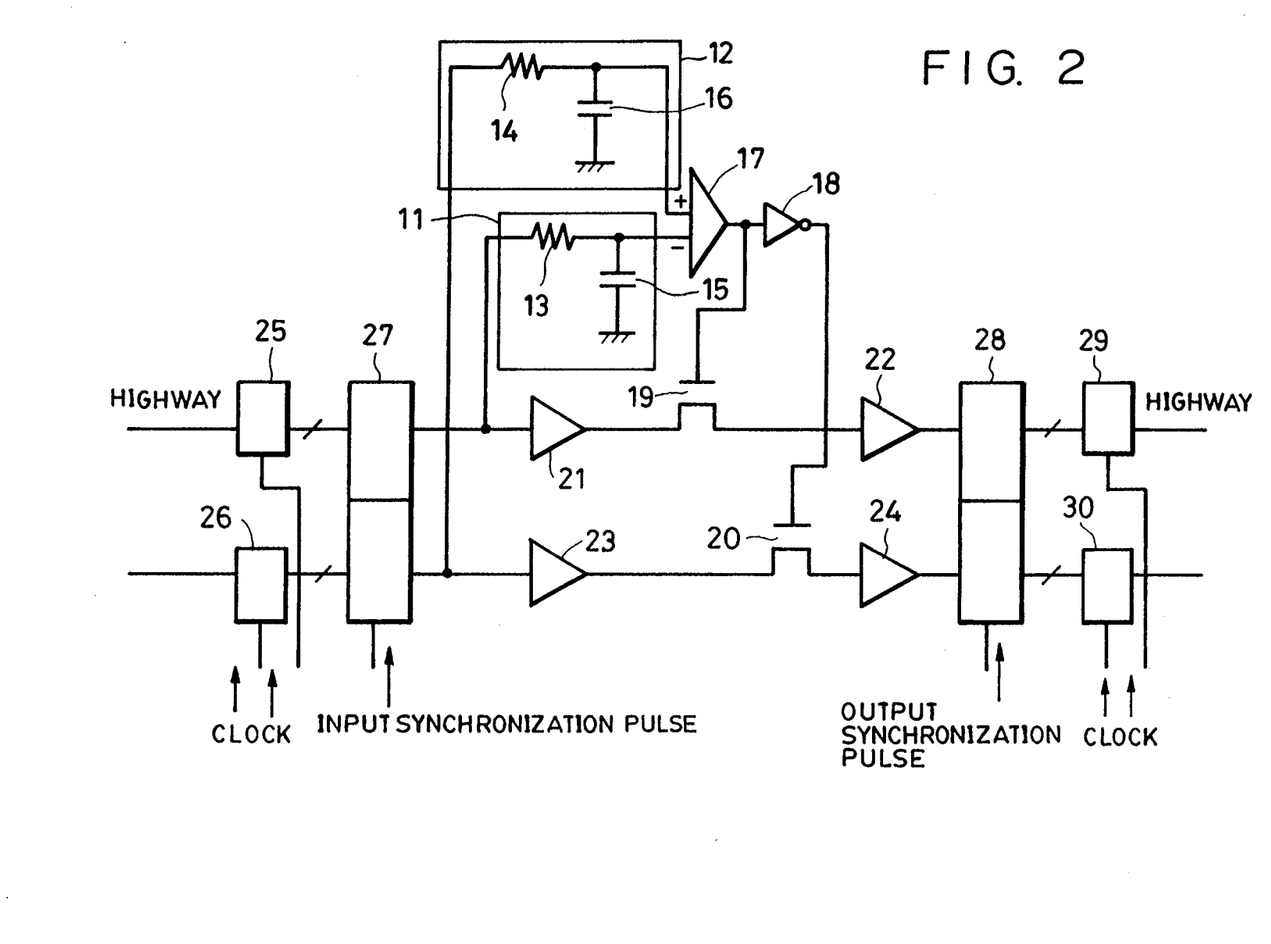
FIG. 2 is a circuit diagram showing an example of the hands-free circuit used in the present invention.

FIG. 2 is a circuit diagram showing an example of the hands-free circuit incorporated in the hands-free trunk 9.

Reference numeral 11 indicates a low-pass circuit for detecting the level of a first reception signal. Reference numeral 12 indicates a low-pass circuit for detecting the level of a second reception signal. The low-pass circuits 11 and 12 are composed of resistors 13 and 14 and capacitors 15 and 16. These low-pass circuits are time-constant circuits adapted to switch over the output of a comparator 17 when the difference in reception-signal level has persisted for a period of time beyond a certain range.

The comparator 17, which compares the signal levels detected by the low-pass circuits 11 and 12, comprises a Schmitt circuit having hysteresis. Reference numeral 18 indicates an inverter (an inversion circuit) for inverting the output of the comparator 17. Reference numeral 19 indicates an analog switch adapted to be turned ON when the level of the first reception-signal level is higher than the second reception-signal level, that is, when the output of the comparator 17 is in a "Low" condition. Reference numeral 20 indicates an analog switch adapted to be turned ON when the second reception-signal level is higher than the first reception-signal level, that is, when the output of the comparator 17 is in a "High" condition and, consequently, the output of the inverter 18 is in a "Low" condition.

Reference numerals 21 to 24 indicate amplifiers for amplifying received voices.

Reference numerals 25 and 26 indicate input circuits, to which are input a digital signal in a time slot selected by the time-division switch 8 and a clock pulse corresponding to this time slot.

Reference numeral 27 indicates a digital/analog (D/A) converter for converting an input digital signal to an analog signal in response to a synchronization pulse.

Reference numeral 28 indicates an analog/digital (A/D) converter which outputs, in response to a synchronization pulse, a digital signal obtained through conversion from an analog signal.

Reference numerals 29 and 30 indicate output circuits for transmitting time-slot signals to highways in response to predetermined clock pulses.

Figure 3:
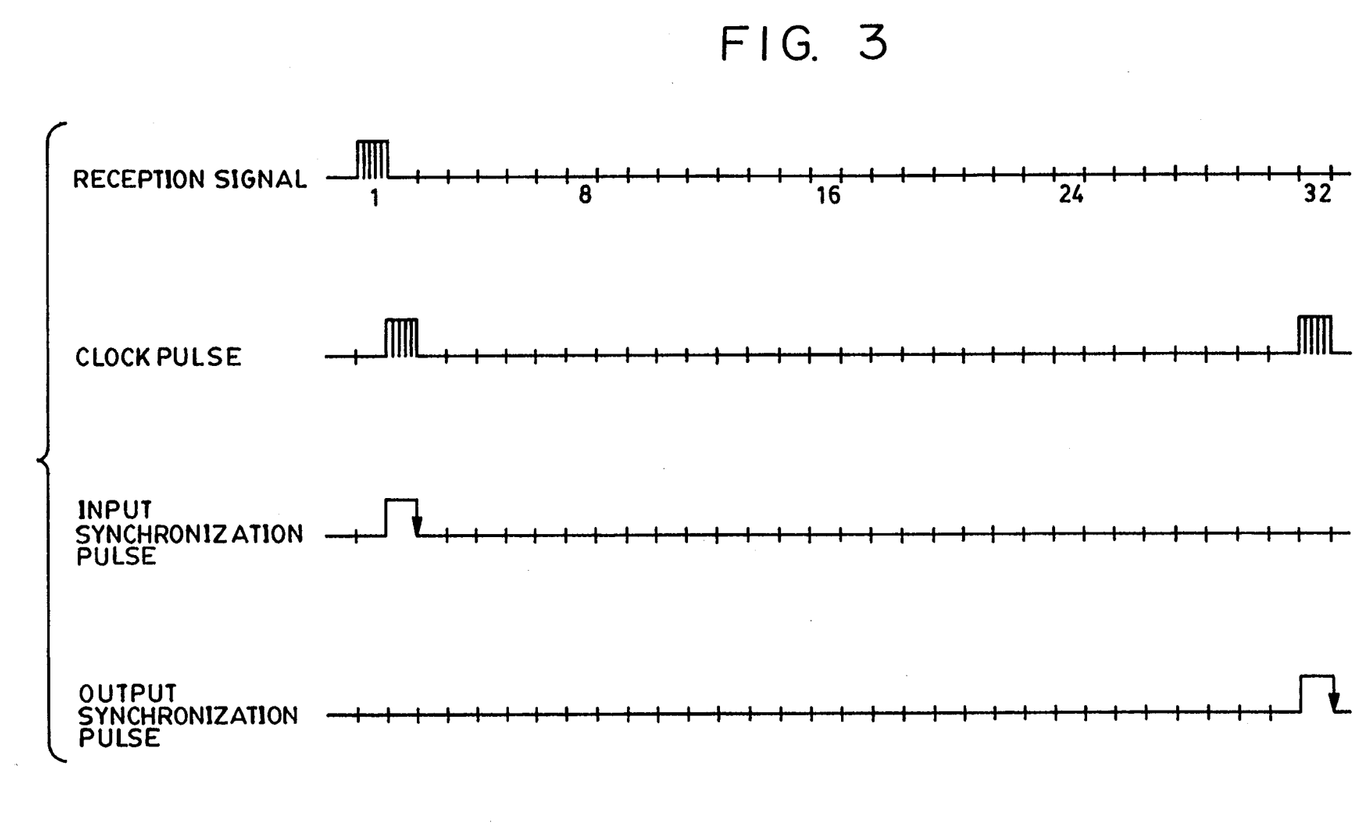
FIG. 3 is a time chart showing the relationship between a reception signal, a clock pulse, and input and output synchronization pulses.

FIG. 3 is a time chart showing the relationship between a reception signal, clock pulses, and input and output synchronization pulses. In this embodiment, thirty-two time slots are multiplexed in one highway. A reception signal input to the input circuit 25 is supplied to the D/A converter 27 in synchronism with a clock pulse. The output from the D/A converter 27 is supplied to the A/D converter 28 in synchronism with a predetermined clock pulse.

In the hands-free circuit described above (FIG. 2), the two time-slot signals (the first and second reception signals) from the highways are supplied to the input circuits 25 and 26 by clock pulses corresponding to these time-slot signals. Then, the first and second reception signals, converted from serial to parallel signals, are input to the D/A converter 27 in synchronism with an input synchronization pulse and converted from digital to analog signals. Subsequently, the signals are input to the comparator 17 via the low-pass circuits 11 and 12. When the signal level of the first reception signal is higher than that of the second reception signal, the output of the comparator 17 is in the "Low" condition, and the analog switch 19 is turned ON. On the other hand, the analog switch 20 is turned OFF, and the first reception signal is input to the A/D converter 28 through the amplifier 22 in synchronism with an output synchronization pulse. The first reception signal, converted to a digital signal by the A/D converter 28, is transmitted from the output circuit 29 to the highway. That is, the first reception signal is sent out, whereas the second reception signal is prevented from being sent out, thereby making it possible to conduct a one-way conversation.

When, in the private branch exchange 1, constructed as described above, a hands-free conversation is to be conducted between extension telephones, as shown in FIG. 1, a hands-free request operation is started by depression of a speaker key or the like, for example, of the extension telephone 3. Then, the switching control section 10 connects the hands-free trunk 9 to the channel. The voice from the extension telephone 3 is conveyed through the time-division switch 8 in the direction of the arrow (a) and supplied to a first input terminal of the hands-free trunk 9. Then, the output from the hands-free trunk 9 is conveyed in the direction of the arrow (b) and input to the time-division switch 8. Subsequently, the output is conveyed in the direction of the arrow (c) and, further, through the extension interface section 7 before it is received by the extension telephone 4.

The voice signal from the extension telephone 4 is conveyed through the extension interface section 7 and in the direction of the arrow (d) before it is input to a second input terminal of the hands-free trunk 9 which terminal is coordinate with the first input terminal. Then, it is conveyed from the hands-free trunk 9 in the direction of the arrow (e) and enters the time-division switch 8, where it is conveyed in the direction of the arrow (f) before it is received by the extension telephone 3.

Of the two input voice signals supplied to the hands-free trunk 9, the one having a higher signal level is output (see FIG. 2), and the one having a lower signal level is not output, thereby realizing a one-way conversation in which the speaker sound is prevented from entering the microphone and the generation of a howling noise is prevented.

Figure 4:
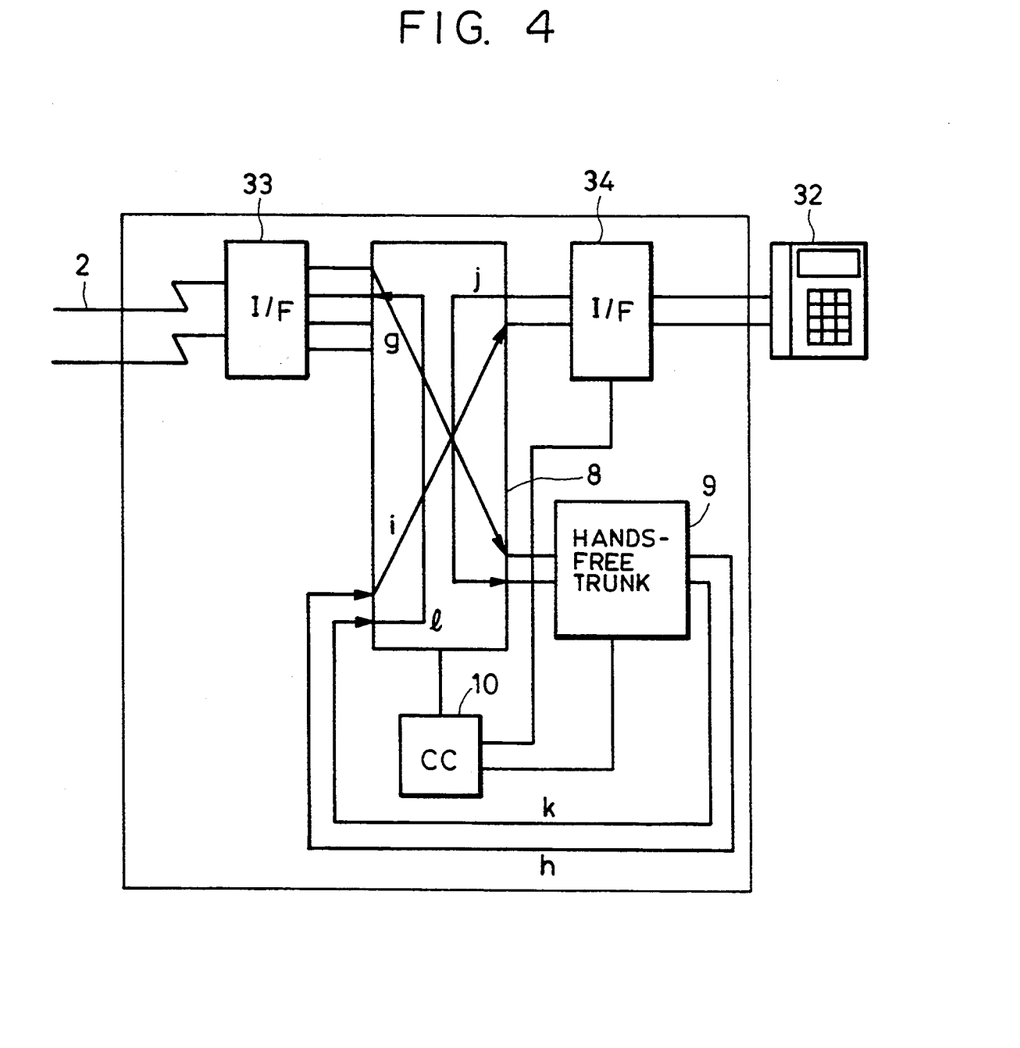
FIG. 4 is a diagram illustrating the signal flow during an outside-line hands-free conversation in another embodiment of the switching apparatus of the present invention.

In the second embodiment shown in FIG. 4, a hands-free conversation is conducted between the telephone line 2 and an extension telephone 32 by using a private branch exchange in accordance with the present invention. A reception signal from the telephone line 2 enters the time-division switch 8 after two-wire/four-wire conversion by an outside-line interface section 33. Then, the signal is conveyed in the direction of the arrow (g) before it is supplied to the first input terminal of the hands-free trunk 9. Then, the output from the hands-free trunk 9 is transmitted in the direction of the arrow (h) and enters the time-division switch 8. It is then conveyed in the direction of the arrow (i) and through an extension interface section 34 before it is received by the extension telephone 32.

The signal from the extension telephone 32 is transmitted via the extension interface section 34 and in the direction of the arrow (j) before it is supplied to the second input terminal of the hands-free trunk 9, which terminal is coordinate the first input terminal mentioned above. Then, the output from the hands-free trunk 9 is transmitted in the direction of the arrow (k) and enters the time-division switch 8, where it is conveyed in the direction of the arrow (l) and supplied to the telephone line 2 via the outside-line interface section 33.

Thus, as in the above-described case, a one-sided conversation as desired can be conducted.

Figure 5:
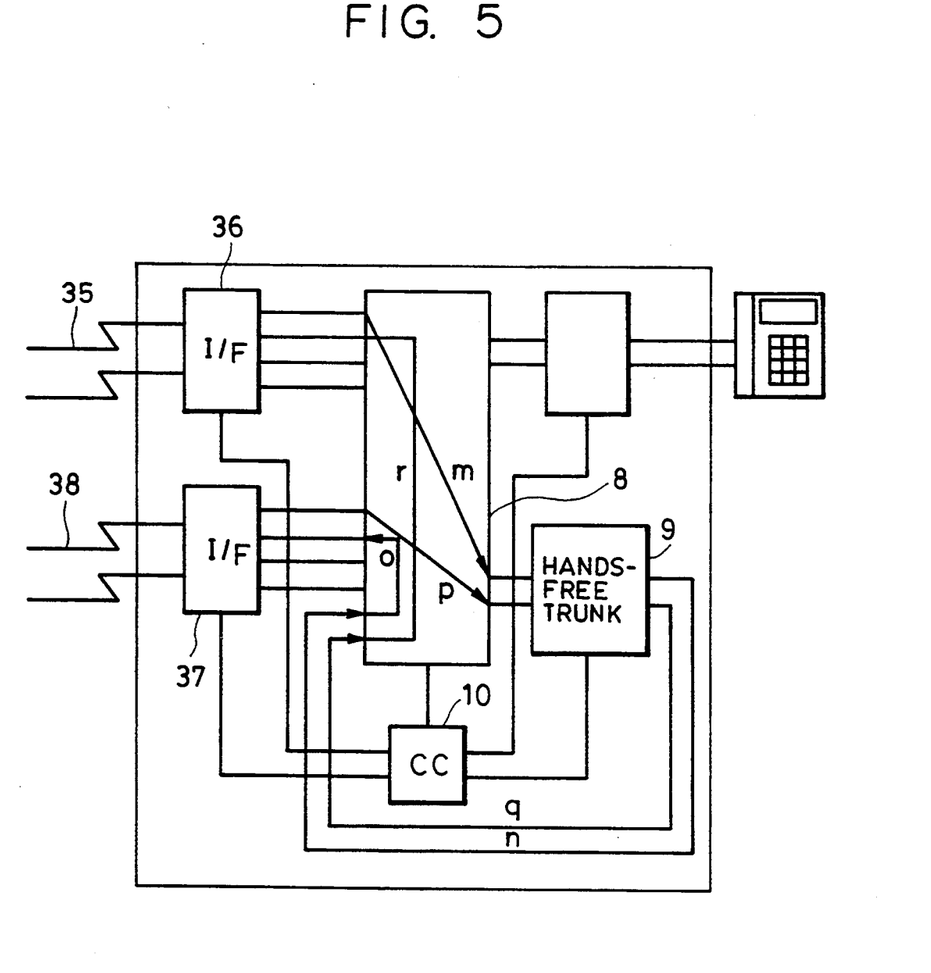
FIG. 5 is a diagram illustrating the signal flow in outside-line transfer in an embodiment of the switching apparatus of the present invention.

In the third embodiment shown in FIG. 5, the hands-free trunk 9 of the private branch exchange is arranged between telephone lines.

In this case, the reception signal from a telephone line 35 is supplied to the time-division switch 8 via an analog-outside-line interface section 36, and is conveyed in the direction of the arrow (m) before it is supplied to the first input terminal of the hands-free trunk 9. The output of the hands-free trunk 9 is transmitted in the direction of the arrow (n) and enters the time-division switch 8, and is then transmitted in the direction of the arrow (o) to a telephone line 38 via an analog-outside-line interface section 37. On the other hand, the signal from a telephone line 38 is transmitted via an outside-line interface section 37 to the time-division switch 8, where it is conveyed in the direction of the arrow (p) before it is supplied to the second input terminal of the hands-free trunk 9, which terminal is coordinate with the first input terminal. Then, the output from the hands-free trunk 9 is transmitted in the direction of the arrow (q) and enters the time-division switch 8 again, where it is conveyed in the direction of the arrow (r) and is transmitted to the telephone line 35 via the analog-outside-line interface section 36.

In this way, a one-way conversation can be realized, thereby preventing the generation of a howling noise, which would otherwise be caused, when transferring an outside call to an outside line, by a reflection of the transmission signal as a result of a mismatching of the balancing circuit due to the conversion from two-wire to four-wire system.

The present invention is not limited to the above embodiments. Various modifications are possible without departing from the spirit and scope of the invention. For example, while in the above embodiments signal input to the hands-free circuit is effected via two highways, it is also possible for two reception signals to be input to a single highway, by being superposed on two time slot signals, thereby simplifying the circuit construction. Further, while in the above embodiments the hands-free circuit uses analog signals, it is also possible to adopt digital processing, comparing the levels of two digital signals and selecting the one having a higher level. Further, the outside line may consist of a digital outside line.

Further, instead of turning off one of the two analog switches in the hands-free circuit in accordance with the output of the comparator, it is also possible to lower the amplification factor of one of the two amplifiers.

Further, by incorporating two or more hands-free circuits in the hands-free trunk, a still wider range of application can be obtained. Of course, still other modifications are possible.

What is claimed is:

1. A telephone switching apparatus comprising:
   a line network to which a plurality of telephones including first and second telephones are connected;
   an echo suppressor whose input and output terminals are connected to said line network, for suppressing a second voice from the second telephone when the second voice is weaker than a first voice from the first telephone; and
   control means for controlling said line network, wherein said line network, under control by said control means, superposes respective voices from the first and second telephones on two time slots of a single highway to said input terminal of said echo suppressor, and transmits an output signal from said output terminal of said echo suppressor to the first telephone.

2. An apparatus according to claim 1, wherein said control means controls said line network such that the output signal from said output terminal of said echo suppressor is transmitted to the first and second telephones.

3. An apparatus according to claim 1, wherein said echo suppressor suppresses a weaker one of the voices from the first and second telephones.

4. An apparatus according to claim 1, wherein the first telephone is connected via an external line of the telephone switching apparatus.

5. An apparatus according to claim 1, wherein the second telephone is connected via an external line of the telephone switching apparatus.

6. A line switching apparatus comprising:
   a line switch for switching a plurality of telephones;
   a suppressor for suppressing a signal from a first one of the plurality of telephones which is weaker than a signal from a second one of the plurality of telephones; and
   control means for controlling said line switch, wherein said line switch, under control by said control means, superposes signals from the first and second telephones on two time slots of a single highway to said suppressor, and supplies an output from said suppressor to the first telephone.

7. An apparatus according to claim 6, wherein said control means controls said line switch such that the output from said suppressor is supplied to the first and second telephones.

8. An apparatus according to claim 6, wherein the first telephone is connected via an external line of the line switching apparatus.

9. An apparatus according to claim 6, wherein the second telephone is connected via an external line of the line switching apparatus.

10. A control method for controlling a line switch including an echo suppressor that suppresses a weaker one of two signals, comprising:
    a superposing step for superposing signals from first and second telephones on two time slots of a single highway to the echo suppressor; and
    a connecting step for connecting an output from the echo suppressor to the first telephone.

11. A method according to claim 10, wherein the signals from the first and second telephones are connected to the output from the echo suppressor in said connecting step.

12. A method according to claim 10, wherein in said connecting step, the first telephone is connected to an external line of the line switch.

13. A method according to claim 10, wherein, in said connecting step, the second telephone is connected to an external line at the line switch.

* * * * *

UNITED STATES PATENT AND TRADEMARK OFFICE
CERTIFICATE OF CORRECTION

PATENT NO. : 5,414,763
DATED : May 9, 1955
INVENTOR(S) : OSAMU HIRATA

It is certified that error appears in the above-identified patent and that said Letters Patent is hereby corrected as shown below:

<u>ON TITLE PAGE</u>

In [56] References Cited, under FOREIGN PATENT DOCUMENTS:

"404154395" should read --4-154395--.

Signed and Sealed this

Twenty-second Day of August, 1995

Attest:

BRUCE LEHMAN

*Attesting Officer*     *Commissioner of Patents and Trademarks*